Figure 3:
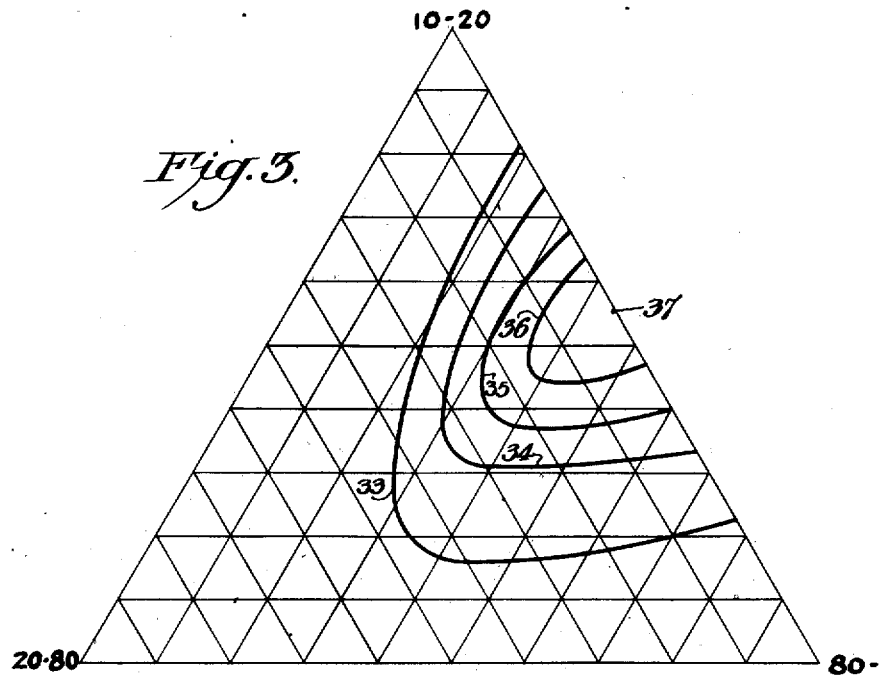

March 29, 1932.  R. P. HEUER  1,851,181
DENSE MIX FOR REFRACTORIES AND PROCESS OF PREPARING THE SAME
Filed March 18, 1930   5 Sheets-Sheet 1
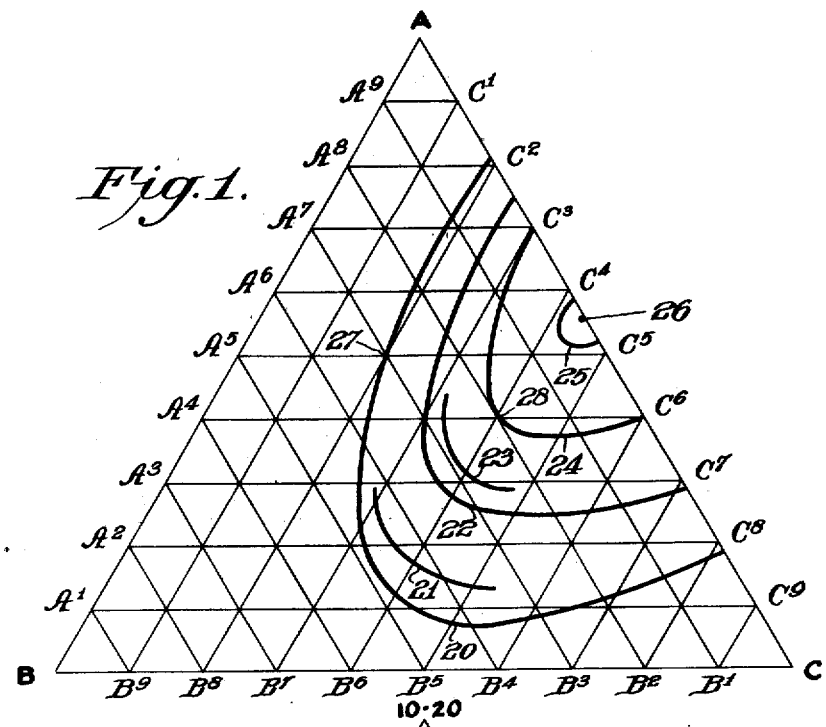
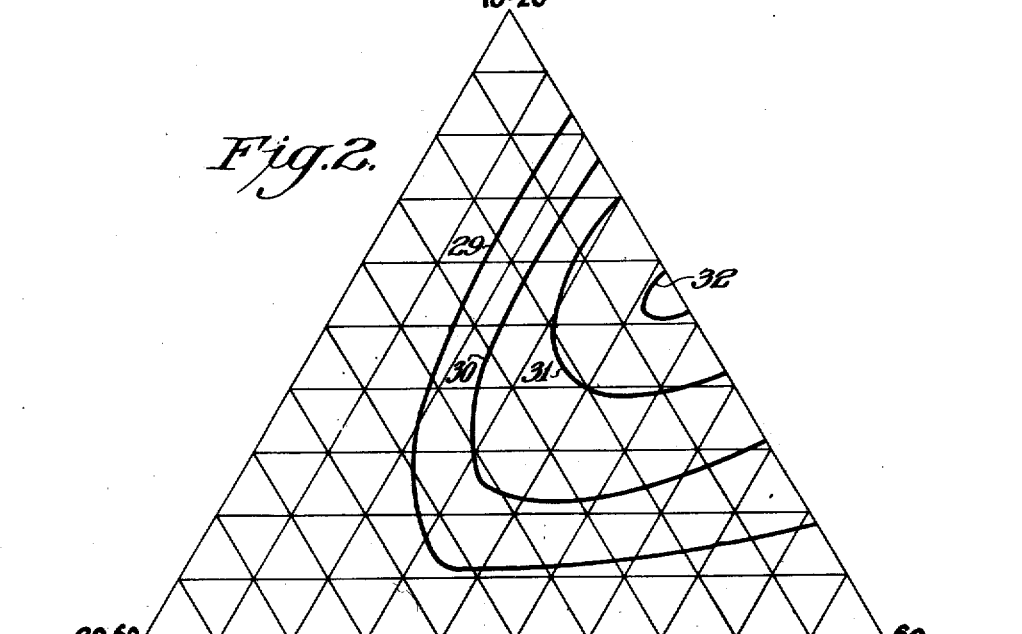

March 29, 1932. R. P. HEUER 1,851,181

DENSE MIX FOR REFRACTORIES AND PROCESS OF PREPARING THE SAME

Filed March 18, 1930   5 Sheets-Sheet 2

Witnesses:

Inventor
Russell P. Heuer,
By
Attorney.

March 29, 1932.  R. P. HEUER  1,851,181
DENSE MIX FOR REFRACTORIES AND PROCESS OF PREPARING THE SAME
Filed March 18, 1930    5 Sheets-Sheet 4

Witnesses:

Inventor
Russell P. Heuer,
By
Attorney.

March 29, 1932.   R. P. HEUER   1,851,181
DENSE MIX FOR REFRACTORIES AND PROCESS OF PREPARING THE SAME
Filed March 18, 1930   5 Sheets-Sheet 5
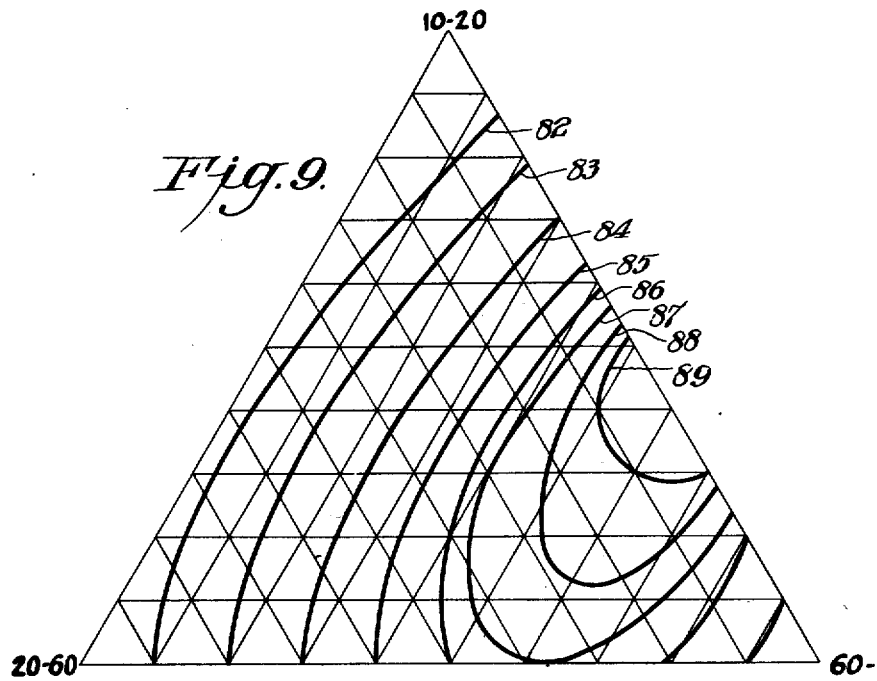
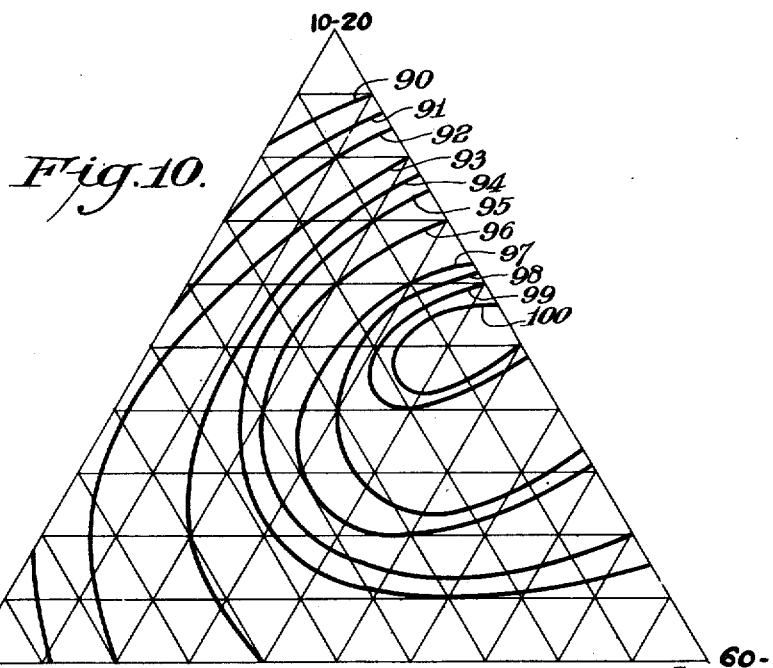
Witnesses:
Inventor
Russell P. Heuer,
By
Attorney.

Patented Mar. 29, 1932

1,851,181

UNITED STATES PATENT OFFICE

RUSSELL P. HEUER, OF PHILADELPHIA, PENNSYLVANIA, ASSIGNOR TO GENERAL REFRACTORIES COMPANY, OF PHILADELPHIA, PENNSYLVANIA, A CORPORATION OF PENNSYLVANIA

DENSE MIX FOR REFRACTORIES AND PROCESS OF PREPARING THE SAME

Application filed March 18, 1930. Serial No. 436,681.

My invention relates to the manufacture of bricks with more particular reference to refractory bricks formed from non-plastic substances, such as silica, chrome ore, calcined magnesia and calcined members of the alumina-silica system including diaspore, cyanite, kaolin and various fire clays.

A purpose of my invention is to secure bricks of greater density and less porosity than otherwise attainable by using non-plastic ingredients and selecting for the mixes particles of different predetermined graded sizes in predetermined relative proportions, in order to yield a diminished interstitial void space between the particles of the mix.

A further purpose is to secure more perfect interfitting between the granular particles of a non-plastic mix for forming bricks, in order to increase the strength of the bricks at high temperature or to reduce the amount of bonding material required in the mix, or both.

A further purpose is to secure high density, great strength and low porosity in bricks by forming the bricks from a mix comprising large and small particles without or unnaturally low in particles of intermediate size, using preferably the predetermined quantities of large and small particles that give a mix of maximum density.

A further purpose is to form a ground non-plastic mix of large and small particles having slightly more weight of the large than of the small particles.

A further purpose is to make refractory bricks from a mix adapted to be represented by a point at or near the focal point of equi-density curves upon a ternary diagram showing mix compositions with respect to the relative quantities of three different graded sizes of particles making up the mix.

Further purposes will appear in the specification and in the claims.

Figure 1 is a typical curve sheet generic to different mixes that may be made from three different consecutive zones or bands of graded sizes of refractory particles of the same material, mixed together in different proportions, one of the results of research work that I have done to determine the way in which the density of a mix is dependent upon the relative quantities of different graded sizes of particles of which the mix is made. The curves are contour curves, as it were, showing loci of equal density plotted upon a ternary diagram and form a guide for interpreting the effect of variations in relative quantities of the three different bands or zones of graded sizes of particles.

Figures 2, 3, 4, 5, 6, 7, 8, 9 and 10 are curve sheets showing ternary diagrams for different specific sizes of graded particles and for different refractory materials, each figure representing the results of a series of research tests for mixes all made from the consecutive bands of graded sizes of particles and from the refractories marked on the figure.

In the drawings similar numerals indicate like parts.

Refractory bricks are aggregates of finely ground particles of the refractory material, differing in properties with the nature of the bond between these particles and the amount of void spaces present.

I have found that the usefulness of refractory bricks can be greatly increased if the amount of void spaces present is decreased provided this decrease can be effected in a way which does not objectionably effect the other properties of the brick.

The efforts which have been made to decrease the void spaces have depended largely upon using materials plastic when cold or which become plastic when hot.

With materials which are plastic when cold, burning causes the plastic components to shrink, increasing the size of the voids, reducing the density and destroying the initial contacts which existed between the particles when the refractory was moulded.

Where the materials are plastic when hot the constituent particles move relatively to each other during burning and the entire volume of the brick shrinks making its ultimate size uncertain and irregular. The refractory character of such brick is limited by the temperature at which the plastic material softens.

In this connection it may be noted that 1.5% of lime which is customarily added in making silica brick is not to be regarded as flux sufficient to cause plastic flow when hot, since it is well known that silica brick withstand static loads practically to the melting point of pure silica without plastic flow. In this case the action of the lime seems to be largely that of assisting the crystallographic change of quartz into crystoballite and tridymite and of producing a surface sintering of the constituent particles of the refractory.

My efforts have been to eliminate the above defects and to secure bodies of high density by maximum interfitting of the particles without plastic flow.

Since my invention depends upon an initial interfitting which is stabilized and retained throughout I strive to secure the most perfect interfitting possible and have made many experiments upon this from the standpoint of the effect of different sized particles upon the ultimate density. In these experiments I have aimed to cover and compare substantially the entire group of commercially important non-plastic refractories.

As a result of these investigations I have constructed ternary diagrams which point to certain relations between the sizes of refractory particles and the voids between them. They enable me to interpret density and proportions of size of refractory particles interchangeably.

I believe that I am the first to study and interpret the density relations of non-plastic refractories by ternary diagrams and also am the first to suggest the proportions for dense mixes disclosed herein.

As disclosed by these experiments, chrome, magnesia, ganister and calcined kaolin, fire clay, cyanite and diaspore act in the same way to produce the same general result. These are illustrated by curves. It will be noted that these curves differ somewhat, depending largely upon the character of fracture of the material, which fracture depends in part on the way in which the fine division of the material has been effected, and also on the nature of the material and on the smoothness or roughness of the surface produced, independently of the shape of the surface.

I regard the above materials as equivalents and would include along with them all those materials which produce similar curves and which like them are substantially free from interstitial flow at low temperatures when mixed with water and at high temperatures.

I have found that the most perfect interfitting possible, is dependent upon the omission of substantially all of an intermediate size of particles and that the best results for some of the materials are secured by wholly omitting this intermediate size but that for ganister, for example, equally good results may be secured using a small quantity—say, 10%—of the intermediate size. This may have been the result of the fracture characteristics of the particles when prepared on the particular mill in question and does not necessarily indicate that in all cases some intermediate size of particles is desirable.

The ternary diagram shown in Figure 1 is intended to be a generic diagram. Three components A, B and C are used. The component A is made up of materials which have passed through some screen which excludes particles too large for desirable use in a brick and which rest upon a screen of mesh size "$a$". The component B is made up of particles which pass through screen "$a$" and which rest upon a screen "$b$". The component C comprises those sizes which have passed through the screen "$b$".

In the diagram the proportion of component A is indicated by the perpendicular distance of any point in question from the line BC and, for convenience, the lines $A'$, $A^2$, $A^3$, $A^4$, $A^5$, $A^6$, $A^7$, $A^8$ and $A^9$ have been drawn parallel with the line BC to indicate percentages of component A from 10% to 90%.

Correspondingly the percentages of components B is represented by the perpendicular distance in the diagram from the line AC, and, for convenience in indicating these percentages, lines $B'$—$B^9$ have been drawn parallel to the line AC to show percentages of component B of 10% to 90%.

In the same way the quantity of component C is indicated by the perpendicular distance from the line AB and lines $C'$—$C^9$ have been drawn parallel to line AB for percentages of component C of 10% to 90%.

At any point within the diagram the sum of the components A, B and C will equal 100%.

With the above explanation, and as a result of tests, curves 20, 21, 22, 23, 24 and 25, and point 26 have been located, each as the loci of mixtures of the different components A, B and C, which respectively have the same density. It will also appear that for curves of lower density such as 20, the variety of different mixes which can be used to secure the desired density is much greater than for curves of higher density, such as 24 and 25; and that for a maximum density at 26 there is but one mix under the conditions of the test which will give the required density, which mix contains substantially no particles of component B.

In order that the application of the subsequent curves may be clear I will give first applications upon the generic curve shown in Figure 1. For example, a refractory mix defined by the location at the point 27 on curve 20 will have 50% of component A, 30% of component B and 20% of component C, while a refractory located at the point 28 on curve 24 will have 40% of A, 20% of B and 40% of C.

Though the diagram of Figure 1 gives a good idea of the character of curve which I have discovered applies generally to the group of non-plastic refractories which I have indicated, I have thought it quite desirable to support this generic curved by specific curves showing the density of mix secured with different common non-plastic refractories in order that the similarity of the specific curves to the generic curve illustrated may be emphasized and that information regarding the different non-plastic refractories may be available.

In the diagrams shown in Figures 2–10 different materials and different bands or belts of sizes of refractory particles are shown as indicated upon the drawings themselves. The curves correspondingly show equal density compositions formed from different proportions of the particles from the several bands.

In Figure 2 the refractory is calcined magnesite, or magnesia. The larger particles, known as the A particles, are such as pass through a 10 mesh screen and rest upon a 20 mesh screen. The intermediate B band of particles is comprised of those which pass through the 20 mesh screen and rest upon a 60 mesh screen. The C particles are those which pass through the 60 mesh screen.

The curves 29, 30, 31 and 32 respectively show equal density mixes of progressively greater density. It will be noted that as the quantity of B material decreases the density of the mixture increases.

Figure 3 shows curves of equal density for chrome, having the A particles of the same size as in Figure 2, passing through a 10 mesh and resting upon a 20 mesh screen, but the B particles rest upon an 80 mesh screen instead of a 60 mesh screen as in Figure 2. The C particles pass through the 80 mesh screen.

The curves 33, 34, 35 and 36 are equal density curves indicating progressively increasing density as the B particles are reduced toward a point 37 on the zero line for B particles.

Figure 4:
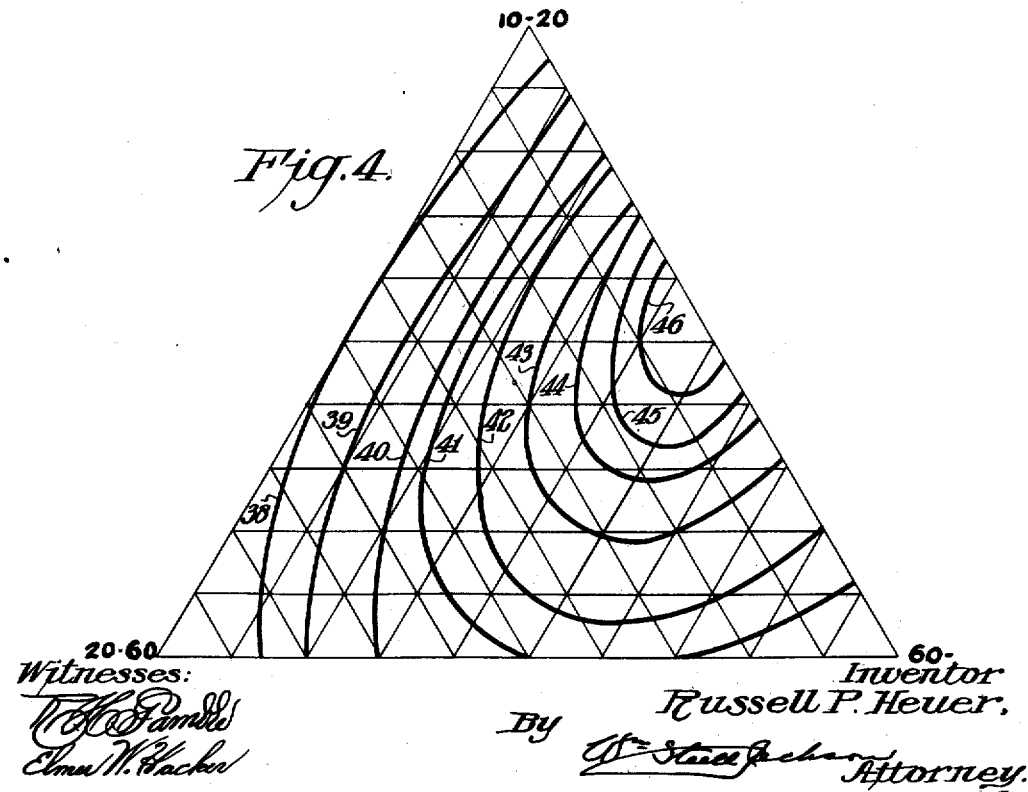

Figures 4–9 show tests upon calcined particles, of which the material in Figure 4 is calcined kaolin. The sizes of the particles in the several belts here correspond with those in Figure 2 and the curves 38, 39, 40, 41, 42, 43, 44, 45 and 46 indicate progressively increasing densities of equal density mixes.

Though no point appears on the zero line for B particles in this Figure 4, it is evident that the density increases as the center of the area approaches the zero line for B particles.

Figure 5:
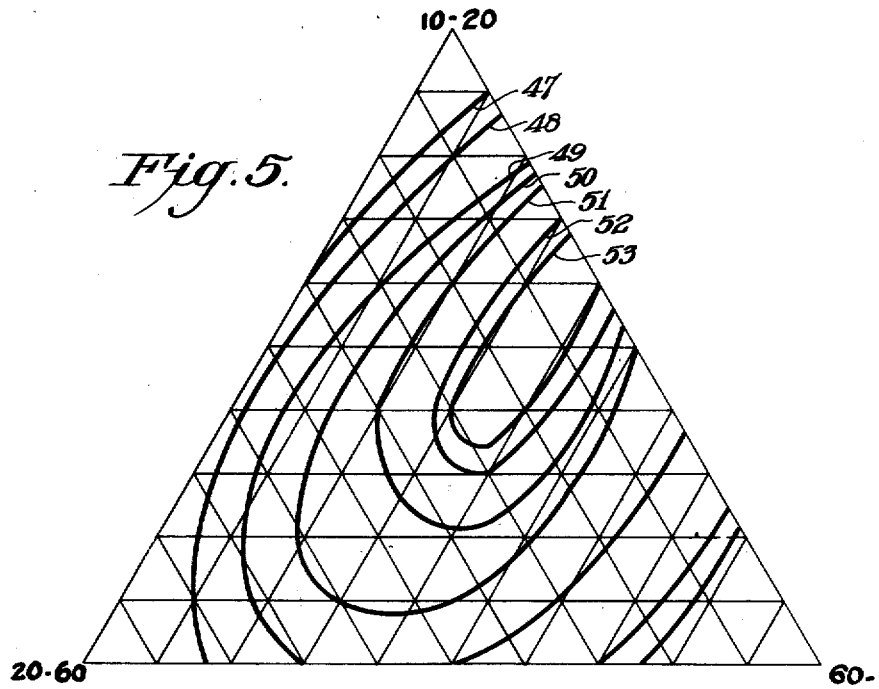

In Figure 5 the material tested is calcined fire clay. The sizes of the particles are again the same as in Figure 2. The curves 47, 48, 49, 50, 51, 52 and 53 represent equal density mixes of progressively increasing density. From this experiment it would appear that there is no disadvantage in having a small percentage of B particles but as this percentage increases the density reduces.

Figure 6:
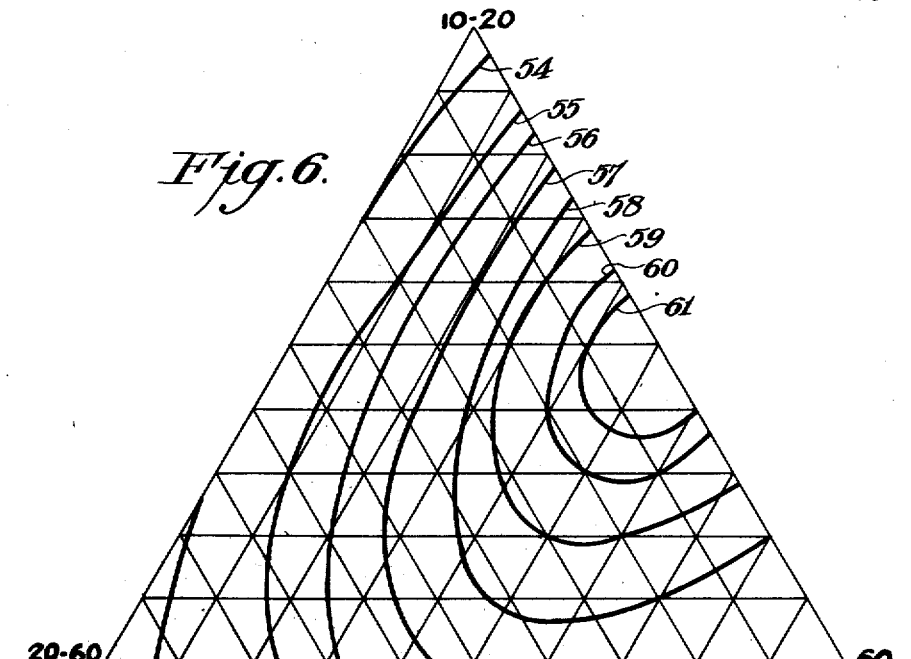
Figure 7:
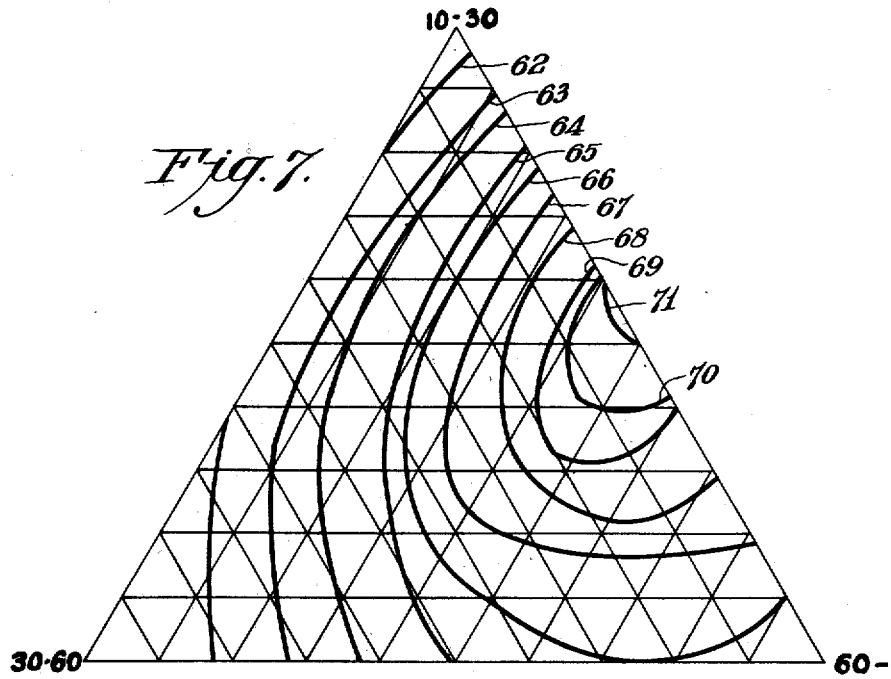
Figure 8:
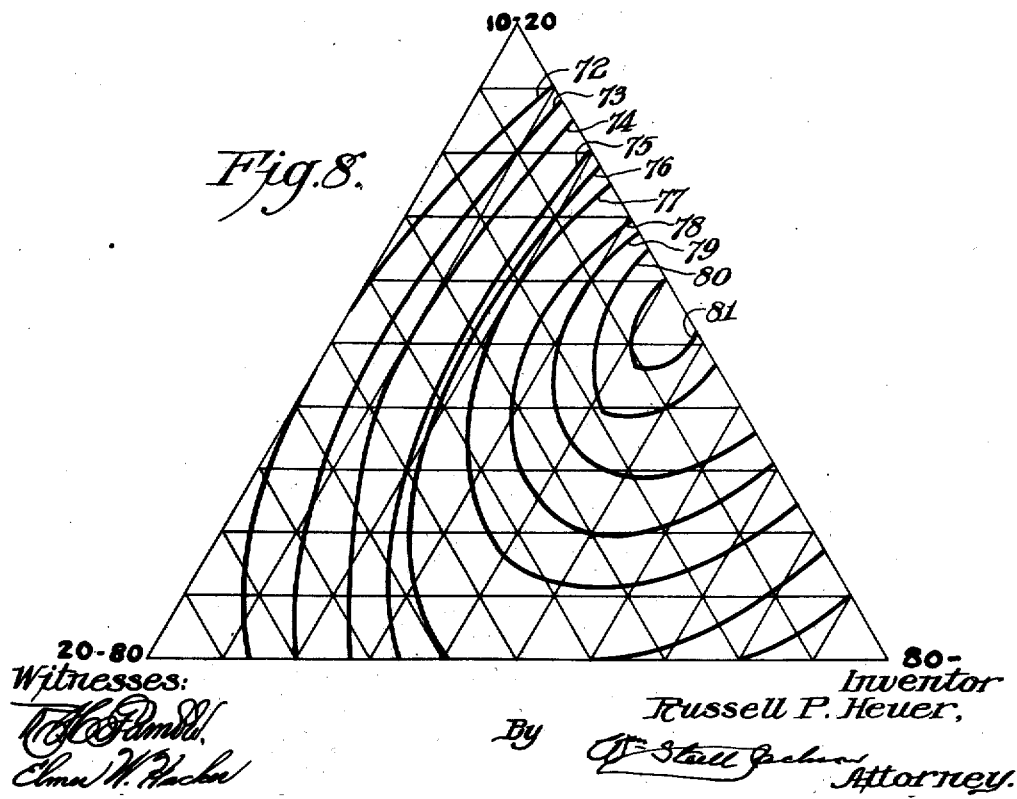

Figures 6, 7 and 8 are illustrated to show tests on calcined cyanite using different belts or bands of particles and the slight effect of these changes upon the density.

In all of these the large sizes pass through a 10 mesh screen but rest on screens of 20, 30 and 20 mesh, respectively, in the three views. The limiting size of mesh between the B and C particles is 60, in Figures 6 and 7 and 80 in Figure 8. The range of sizes among the B particles is, therefore, least in Figure 7 where they lie between the 30 and 60 mesh sizes, next in Figure 6, where the range is from the 20 mesh to the 60 mesh; and greatest in Figure 8 where they range from 20 mesh to 80 mesh.

The comparison of the contour lines of these Figures 6, 7 and 8 indicates that the variation of screens in making the separation for these figures makes very little difference in the results as the loci of maximum density are located nearly in the same position upon the diagrams. The curves are numbered from 54 to 61 in Figure 6, from 62 to 71 in Figure 7 and from 72 to 81 in Figure 8.

The maximum density shown by curves 61, 71 and 81, respectively, all cut the line of zero B particles and lie in their entireties fairly close to it.

In Figure 9 calcined diaspore was used with the same range of screen separation as in Figure 2. The curves are numbered from 82 to 89 and the maximum density curve at 89 lies close to the zero line for B particles, as before.

In Figure 10 the material shown is ganister and the screen lines of separation are the same as in Figure 2. Curves have been shown numbered from 90 to 100 and the curve of maximum density 100 cuts the line of zero quantity of B particles and at no place departs from it further than is represented by 20% of these particles.

These illustrations, showing the results of actual tests made, have been included for the purpose merely of showing a basis of actual and careful experimentation and not for the purpose of limitation. From them, however, it is obvious that the density is considerably and progressively increased by keeping low at any rate, if not eliminating B particles.

The variation shown within the individual diagrams is quite considerable. In Figure 6, for example, the mix in the curve of maximum density is more than 40% more dense than the curve of minimum density, which latter representing 95% or over of B particles present. This, of course, does not represent 40% improvement over the best prior art, as the comparison is between the best and the worst combinations attainable with the range of bands of size of particles selected.

After the particles have been properly selected and thoroughly mixed moist (or mixed and then moistened) they are placed in the molds and pressed.

I much prefer high pressure for the pressing operations, getting the best results at pressure of 5000 or 10000 pounds per square inch, but secure good results at pressure of 1000 pounds per square inch. The higher pressures seem to more thoroughly interfit the particles than is possible with lower pressure making a slight but quite desirable increase in the density.

For the reason above, though my invention is primarily and broadly directed to the selection of the particles for maximum interfitting, I feel that there is a combination between this combination of particles and high pressure to secure the best results.

It will be evident that my bricks secure maximum density mainly by so selecting the particles as to initially fill up the voids with a refractory material without need of flow of materials used, either cold or hot.

These bricks possess volumetric stability and retain their burning substantially their initial size and shape together with a minimum of interstitial spaces.

It will be evident that the best results are secured by the use of coarser grains nearly uniform in size and large enough not to pass through a 30 mesh screen.

Although it is advantageous to select the coarser particles of nearly uniform size it can be seen from the tests plotted that variation of the size of the coarse grains from a range of 10–20 mesh screen to a range of 10–30 mesh screen did not make much difference.

Bands or zones above 10 mesh screen size can also be chosen if desired, keeping in mind the desirability of having the grains as uniform in size as is practicable. Particles greater than 10 mesh have only a limited application and small amounts of particles greater than 10 mesh may be tolerated in conjunction with the 10–20 mesh band without seriously affecting the quality of the brick.

The fine grains should be passed through 60 or 80 mesh screens or even finer to get the best results. Fine grinding is expensive, however, and I find that the size of the fine screen can be reduced to 50 mesh without seriously affecting the quality of the brick.

As will be seen from Figure 1 as well as from the other figures, the most desirable mix is 55% of larger particles and 45% of smaller particles, although mixes having from 45 to 65% of larger particles and from 55 to 35% of smaller particles are very dense. I will use proportions within these ranges.

By reference to subjecting my refractory to firing temperature I intend to include both kiln firing or heating to firing temperature in a furnace lining during use, without previous kiln firing.

When I refer to percentages or quantities of particles of any size, I mean percentages or quantities by weight in all cases.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. A refractory body of low porosity composed of non-plastic material, free from plastic material and from added fluxes consisting of a graded mixture of ground particles comprising not less than 40% and not more than 60% of fine material capable of passing through a 50 mesh screen and not more than 60% nor less than 40% of coarse material of nearly uniform graded size and large enough to be retained on a 30 mesh screen.

2. A composition for making refractory brick comprising particles larger than will pass through a 20 mesh screen and particles smaller than will pass through a 60 mesh screen unnaturally deficient in sizes between these, substantially free from plastic material and from material which will flow at burning temperatures.

3. The method of producing refractory brick of high density from non-plastic material free from added fluxes, which consists in grading a finely ground non-plastic material into relatively coarse, intermediate and relatively fine particles, in mixing the coarse and fine particles, free from plastic material with substantial elimination of intermediate particles and in approximately equal proportions by weight, in forming the brick, in interfitting the particles of the refractory within the brick by high pressure and in subjecting the brick to firing temperature.

4. The method of producing refractory brick of high density from non-plastic material free from added fluxes, which consists in grading a finely ground non-plastic material into relatively coarse, intermediate and relatively fine particles, in mixing the coarse and fine particles, free from plastic material in approximately equal proportions by weight, while employing as a maximum a relatively small proportion of intermediate particles and as a minimum no intermediate particles, in forming the brick, in interfitting the particles of the refractory within the brick by high pressure and in subjecting the brick to firing temperature.

5. The method of preparing a refractory of high density from non-plastic material free from plastic material and from flux sufficient to cause plastic flow when hot, using non-plastic particles separated by screening into relatively larger and smaller grain sizes, which consists in mixing larger non-plastic particles between 10 and 30 mesh per linear inch in the proportion of 45 to 65%, with smaller non-plastic particles finer than 50 mesh per linear inch in the proportion of 55 to 35%, while employing as a maximum a relatively small proportion of intermediate grain sizes and as a minimum no intermediate grain sizes, in pressing the mixture in moist condition, in drying the pressed mixture and in subjecting it to firing temperature.

6. The method of preparing a refractory of high density from non-plastic material free from plastic material and from flux sufficient to cause plastic flow when hot, using non-plastic particles separated by screening into relatively larger and smaller grain sizes, which consists in mixing larger non-plastic particles between 10 and 30 mesh per linear inch in the proportion of 45 to 65%, with smaller non-plastic particles finer than 50 mesh per linear inch in the proportion of 55 to 35%, while excluding intermediate grain sizes, in pressing the mixture in moist condition, in drying the pressed mixture and in subjecting it to firing temperature.

7. The method of preparing a refractory of high density from non-plastic material free from plastic material and from flux sufficient to cause plastic flow when hot, using non-plastic particles separated by screening into relatively larger and smaller grain sizes, which consists in mixing larger non-plastic particles between 10 and 30 mesh per linear inch in the proportion of 55%, with smaller non-plastic particles finer than 50 mesh per linear inch in the proportion of 45%, in pressing the mixture in moist condition, in drying the pressed mixture and in subjecting it to firing temperature.

8. The method of preparing a refractory of high density from non-plastic material free from plastic material and from flux sufficient to cause plastic flow when hot, using non-plastic particles separated by screening into relatively larger and smaller grain sizes, which consists in mixing larger non-plastic particles between 10 and 30 mesh per linear inch in the proportion of 45 to 65%, with smaller non-plastic particles finer than 50 mesh per linear inch in the proportion of 55 to 35%, while employing as a maximum a relatively small proportion of intermediate grain sizes and as a minimum no intermediate grain sizes, in pressing the mixture in moist condition under a pressure exceeding 1000 pounds per square inch, in drying the pressed mixture and in subjecting it to firing temperature.

9. The method of preparing a refractory of high density from non-plastic material free from plastic material and from flux sufficient to cause plastic flow when hot, using non-plastic particles separated by screening into relatively larger and smaller grain sizes, which consists in mixing larger non-plastic particles between 10 and 30 mesh per linear inch in the proportion of 55%, with smaller non-plastic particles finer than 50 mesh per linear inch in the proportion of 45%, in pressing the mixture in moist condition under a pressure exceeding 1000 pounds per square inch, in drying the pressed moisture and in subjecting it to firing temperature.

10. A high density refractory body of non-plastic material, free from plastic material and from flux sufficient to cause plastic flow when hot, composed of 45 to 65% of larger non-plastic particles between 10 and 20 mesh per linear inch, tightly interfitted with 55 to 35% of smaller non-plastic particles finer than 50 mesh per linear inch and having as a maximum a relatively small proportion of intermediate grain sizes and as a minimum no intermediate grain sizes.

11. A high density refractory body of non-plastic material, free from plastic material and from flux sufficient to cause plastic flow when hot, composed of 45 to 65% of larger non-plastic particles between 10 and 20 mesh per linear inch, tightly interfitted with 55 to 35% of smaller non-plastic particles finer than 50 mesh per linear inch and free from intermediate grain sizes.

12. A high density refractory body of non-plastic material, free from plastic material and from flux sufficient to cause plastic flow when hot, composed of 45 to 65% of larger non-plastic particles between 10 and 30 mesh per linear inch, tightly interfitted with 55 to 35% of smaller non-plastic particles finer than 50 mesh per linear inch and having as a maximum a relatively small proportion of intermediate grain sizes and as a minimum no intermediate grain sizes.

13. A high density refractory body of non-plastic material, free from plastic material and from flux sufficient to cause plastic flow when hot, composed of 45 to 65% of larger non-plastic particles between 10 and 30 mesh per linear inch, tightly interfitted with 55 to 35% of smaller non-plastic particles finer than 50 mesh per linear inch and free from intermediate grain sizes.

14. A high density refractory body of non-plastic material, free from plastic material and from flux sufficient to cause plastic flow when hot, composed of 45 to 65% of larger non-plastic particles between 10 and 30 mesh per linear inch, tightly interfitted with 55 to 35% of smaller non-plastic particles finer than 80 mesh per linear inch and having as a maximum a relatively small proportion of intermediate grain sizes and as a minimum no intermediate grain sizes.

15. A high density refractory body of non-plastic material, free from plastic material and from flux sufficient to cause plastic flow when hot, composed of 45 to 65% of larger non-plastic particles between 10 and 30 mesh per linear inch, tightly interfitted with 55 to 35% of smaller non-plastic particles finer than 80 mesh per linear inch and free from intermediate grain sizes.

16. A high density refractory body of non-plastic material, free from plastic material and from flux sufficient to cause plastic flow when hot, composed of 55% of larger non-plastic particles between 10 and 30 mesh per linear inch, tightly interfitted with 45% of smaller non-plastic particles finer than 50 mesh per linear inch.

RUSSELL P. HEUER.

CERTIFICATE OF CORRECTION.

Patent No. 1,851,181.

Granted March 29, 1932, to

RUSSELL P. HEUER.

It is hereby certified that error appears in the printed specification of the above numbered patent requiring correction as follows: Page 2, line 89, for the word "percentages" read percentage, and lines 89 and 90, for "components" read component; page 4, line 26, for "their" first occurrence read after; page 5, line 75, claim 9, for "moisture" read mixture; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.

when hot, composed of 45 to 65% of larger non-plastic particles between 10 and 30 mesh per linear inch, tightly interfitted with 55 to 35% of smaller non-plastic particles finer than 80 mesh per linear inch and free from intermediate grain sizes.

16. A high density refractory body of non-plastic material, free from plastic material and from flux sufficient to cause plastic flow when hot, composed of 55% of larger non-plastic particles between 10 and 30 mesh per linear inch, tightly interfitted with 45% of smaller non-plastic particles finer than 50 mesh per linear inch.

RUSSELL P. HEUER.

CERTIFICATE OF CORRECTION.

Patent No. 1,851,181.

Granted March 29, 1932, to

RUSSELL P. HEUER.

It is hereby certified that error appears in the printed specification of the above numbered patent requiring correction as follows: Page 2, line 89, for the word "percentages" read percentage, and lines 89 and 90, for "components" read component; page 4, line 26, for "their" first occurrence read after; page 5, line 75, claim 9, for "moisture" read mixture; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.

CERTIFICATE OF CORRECTION.

Patent No. 1,851,181.                                       Granted March 29, 1932, to

RUSSELL P. HEUER.

It is hereby certified that error appears in the printed specification of the above numbered patent requiring correction as follows: Page 2, line 89, for the word "percentages" read percentage, and lines 89 and 90, for "components" read component; page 4, line 26, for "their" first occurrence read after; page 5, line 75, claim 9, for "moisture" read mixture; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.